Dec. 2, 1941.  C. G. NAYLOR  2,264,581
PIPE COUPLING
Filed Nov. 13, 1939  3 Sheets-Sheet 1
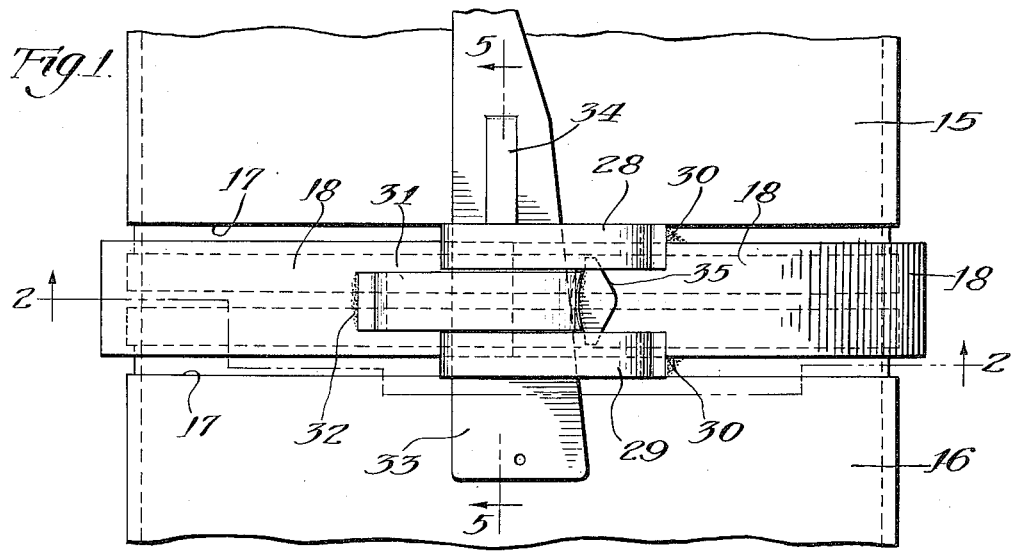
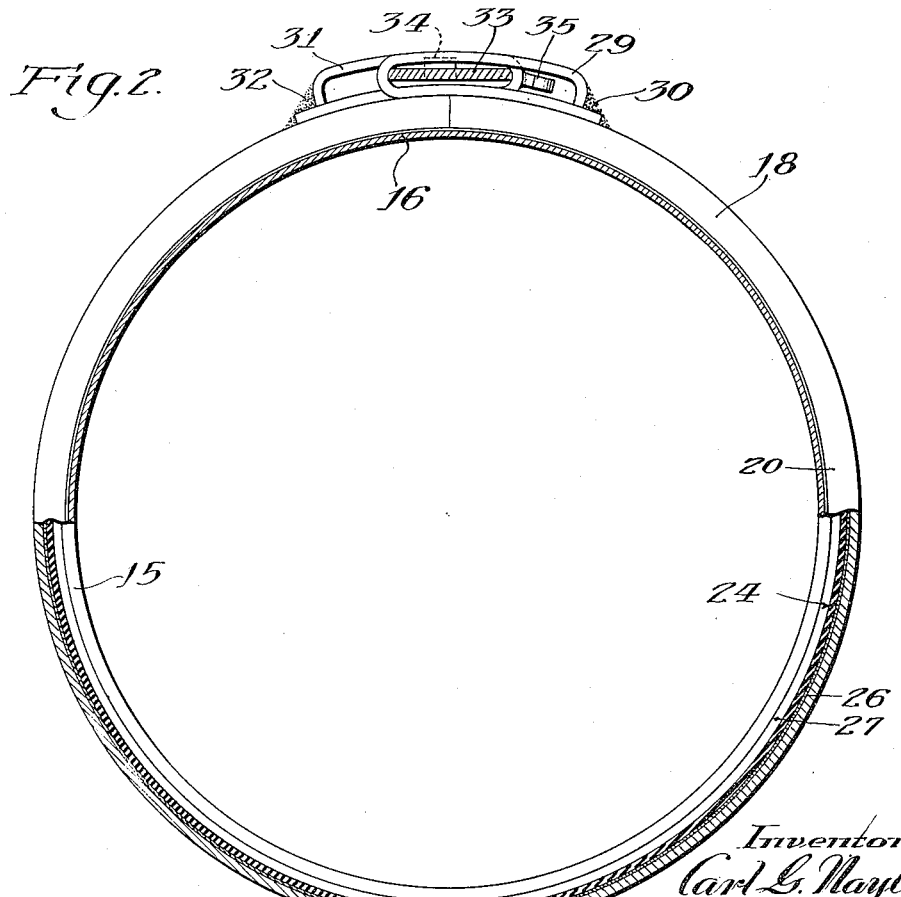
Inventor:
Carl G. Naylor
By Pabel, Carlson, Gritzbaugh & Wells
Attorneys.

Dec. 2, 1941.   C. G. NAYLOR   2,264,581
PIPE COUPLING
Filed Nov. 13, 1939   3 Sheets-Sheet 2
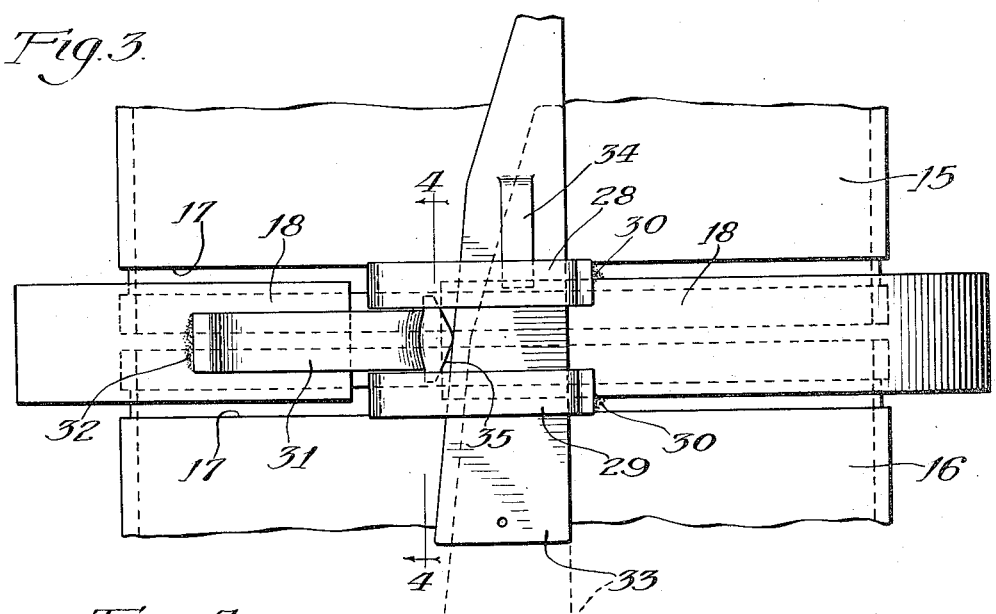
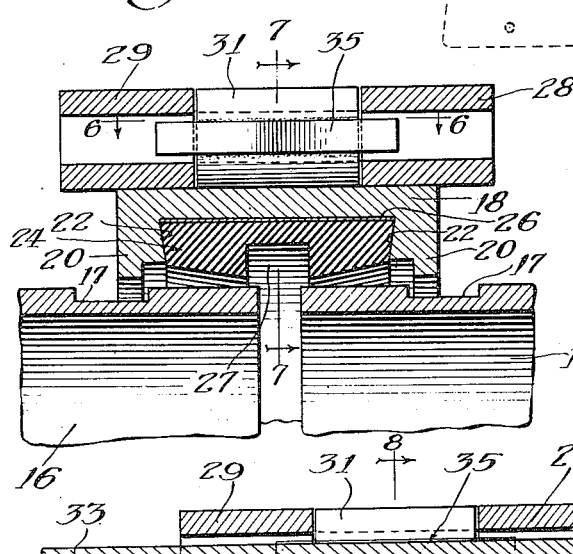
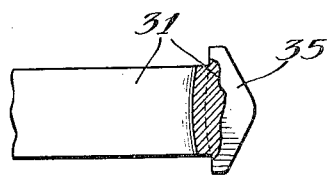
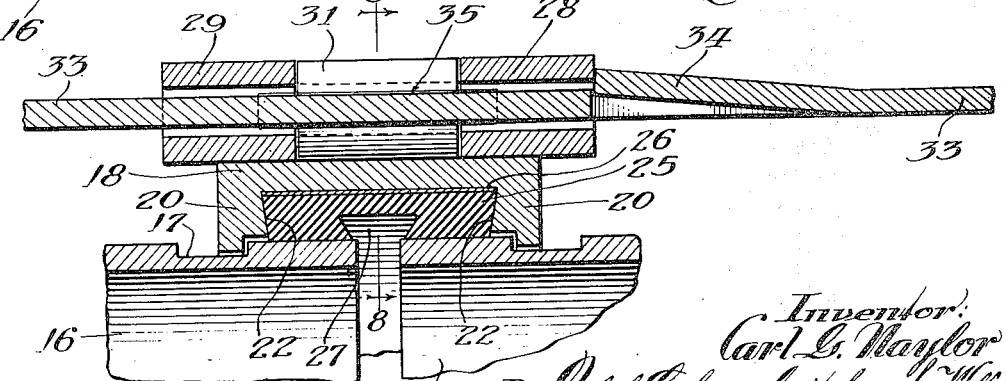
Inventor:
Carl G. Naylor
By Jabel, Carlson, Gritzbaugh & Wells
Attorneys.

Dec. 2, 1941.   C. G. NAYLOR   2,264,581
PIPE COUPLING
Filed Nov. 13, 1939   3 Sheets-Sheet 3
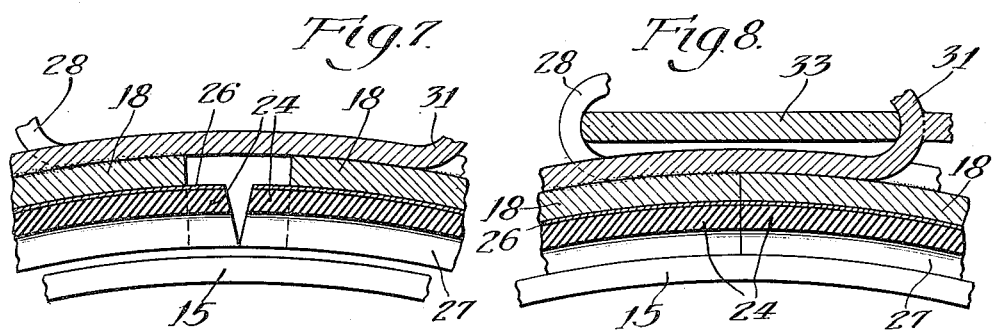
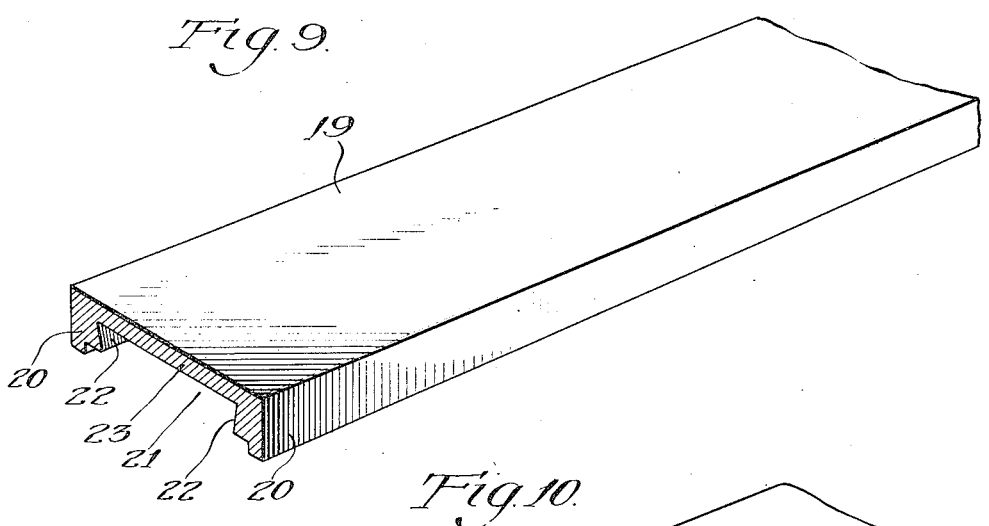
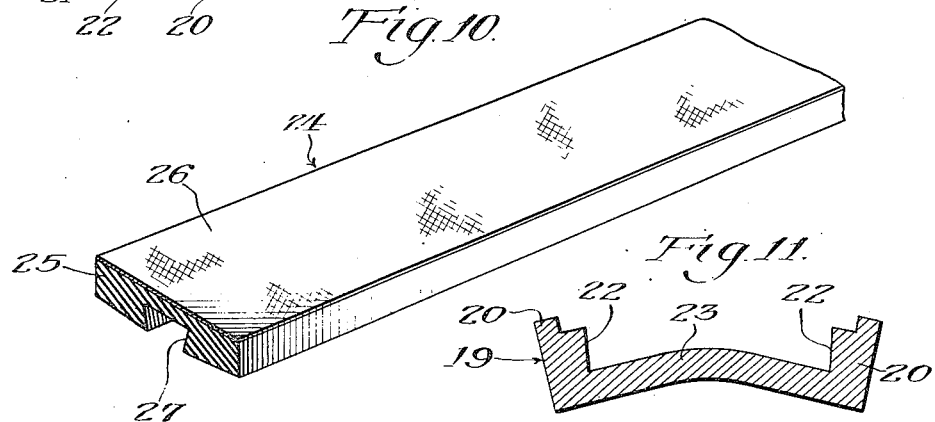
Inventor
Carl G. Naylor
By Zabel, Carlson, Gritzbaugh & Wells
Attorneys Patented Dec. 2, 1941

2,264,581

UNITED STATES PATENT OFFICE 2,264,581

PIPE COUPLING

Carl G. Naylor, Chicago, Ill., assignor to Naylor Pipe Company, Chicago, Ill., a corporation of Illinois Application November 13, 1939, Serial No. 304,187

7 Claims. (Cl. 285—129)

The invention relates to pipe couplings and has for one of its objects the provision of an improved means for coupling two lengths of pipe to each other, the coupling being adapted to provide a fluid-tight joint between the pipes.

Another object of the invention is to provide an improved pipe coupling which may be expanded readily so that it may be slipped along a pipe to bring it into position to couple the pipe to a second pipe.

Another object of the invention is to provide an improved pipe coupling which may be easily removed from its operative position on a pipe line when it is desired to uncouple a length of pipe from the pipe line.

Another object of the invention is to provide an improved pipe coupling having a gasket of improved construction for forming a fluid-tight joint between two lengths of pipe.

Another object of the invention is to provide an improved pipe coupling comprising relatively few parts.

Still another object of the invention is to provide improved locking and opening means for a pipe coupling.

It is well-known that in installing pipe lines emergencies frequently arise where it is imperative to install the pipe line or to make a coupling as quickly as possible. It may be necessary to establish a line to remove gas that endangers the lives of workmen. Breaks in pipe lines may cut off a water supply that must be immediately replaced. The present coupling is of particular advantage in such emergencies. Its one-piece characteristic eliminates the necessity of bolts and nuts, loose gaskets, and other extra parts. Special tools that would not normally be present are not needed to join two pipe ends with the present coupling. A very important feature of the present invention, therefore, lies in its one-piece characteristic and the simplicity of its installation.

In one form of the invention, a pipe coupling is provided which comprises a split ring which is channel-shaped in cross section to provide a groove in its inner face circumferentially thereof, which groove receives a gasket of rubber or other suitable material, the gasket being of improved construction and being held securely in position without the use of adhesives or the like. In the preferred construction, the split ring may have its ends forced apart to expand the ring so that the ring with the gasket may be slipped along a length of pipe into a position wherein it may be contracted to couple the pipe to a second length of pipe. An improved means is provided for locking the coupling in its operative position and for forcing the ends of the ring away from each other when it is desired to slip the ring along a length of pipe or to remove it from its operative position wherein it couples two lengths of pipe to each other.

Other objects and advantages will become apparent as the following detailed description progresses, reference being had to the accompanying drawings wherein—

Fig. 1 is a top plan view of fragmentary portions of two pipes secured together by the improved arrangement forming the subject matter of this application;

Fig. 2 is a vertical cross sectional view taken substantially at the line 2—2 of Fig. 1;

Fig. 3 is a view similar to Fig. 1 but it shows the parts in position over the ends of two adjacent pipes as it appears before the improved coupling is contracted to couple the pipes to each other;

Fig. 4 is a vertical cross sectional view taken substantially at the line 4—4 of Fig. 3;

Fig. 5 is a vertical cross sectional view taken substantially at the line 5—5 of Fig. 1;

Fig. 6 is a horizontal sectional view taken substantially at the line 6—6 of Fig. 4;

Fig. 7 is a vertical sectional view taken substantially at the line 7—7 of Fig. 4;

Fig. 8 is a vertical sectional view taken substantially at the line 8—8 of Fig. 5;

Fig. 9 is a perspective view of a section of rolled metal stock from which the band is formed;

Fig. 10 is a perspective view of a section of reinforced rubber stock from which the gasket is formed, and Fig. 11 is a cross sectional view of the rolled metal bar of Fig. 9 at an intermediate step in the formation of the bar.

Referring now to the several figures of the drawings, in which corresponding parts are indicated by the same reference characters, 15 and 16 indicate metal pipes of any usual type each provided with a circumferential groove 17 in its end portion. In use, two such pipes are placed in aligned position with the ends of the pipes substantially together. The coupling forming the subject matter of this application is provided for joining two such pipes together by a fluid-tight joint.

The improved coupling comprises a split band or ring 18 bent into shape from a bar of steel 19 in the form of a channel as is best shown in Fig. 9, the bar being bent in the direction for bringing the flange portions 20 on the inside of the ring as is clearly shown in Figs. 4 and 5. As is clearly shown in said Figs. 4 and 5, the groove 21 between the flanges 20 is under-cut, the inner faces 22 of the flanges 20 being in divergent position outwardly with respect to each other.

The bar 19 is preferably formed by a rolling operation, the rollers being afforded access to the flange faces 22 for such rolling by reason of the intermediate web portion 23 of the bar being in angular form as shown in Fig. 11, the web 23 being later straightened out for bringing the faces 22 into their normal angular position with respect to each other.

Within the groove 21 of the band 18, a gasket 24 is provided comprising a strip 25 of yielding material, preferably of rubber, and a strip 26 of fabric secured fixedly in position on the outer face of the rubber strip 25. The fabric is intended to avoid undue changing of the gasket in length in the mounting thereof. The strip of fabric 26 is applied to the gasket during the molding operation. The gasket 24 is provided with a groove 27 in its inner face, the thickness of the strip 25 at opposite sides of the groove 27 being somewhat greater than the thickness of the strip at its side edges, as is clearly shown in Figs. 4 and 10. The gasket 24 is of substantially the same width as that of the groove 21 in the band 18 at the widest part of the groove, so that when the gasket 24 is pressed into the groove 21 the gasket is given a snug fit in the groove with the inner face portions compressed sufficiently for holding the gasket securely in position in the groove. The gasket may, however, be bevelled at the side edges to conform to the groove.

The split band or ring 18 is of such construction that its ends may be forced apart, as hereinafter explained, into the positions wherein they are shown in Figs. 3 and 7 so that the ring or band is in an expanded condition. The ring may then be slipped over one end of a pipe and one end of another pipe may be brought into position adjacent the end of the first mentioned pipe, after which the coupling may be aligned with the joint between the pipes as shown in Figs. 3, 4 and 7. Of course the band or ring 18 is preferably made of metal having sufficient resiliency to insure that the ring will not take any substantial permanent set when it is expanded to have its ends brought into the relative positions wherein they are shown in Figs. 3 and 7. After the band is aligned with the joint it is contracted or compressed as hereinafter explained to lock the pipes to each other and to cause the gasket 24 to form a fluid-tight seal at the joint.

As is clearly shown in Fig. 7, in which the band 18 is still in its opened condition, the gasket 24 is cut of such length that the ends of the gasket extend beyond the ends of the band sufficiently to provide a surplus of rubber at the split to compress when the band ends are brought together. The gasket is cut so that the end faces stand in outwardly diverging position. The purpose of having the gasket projected beyond the ends of the ring or band 18 is to have an excess of gasket material at these points so that when the ring is contracted or compressed, the ends of the gasket will be contracted or compressed circumferentially to insure a fluid-tight joint between the ends of the gasket.

For drawing the separated ends of the band 18 together from the position as shown in Fig. 7 to the position as shown in Fig. 8, two loops 28 and 29 are secured upon one end of the band 18 by being welded thereto at 30, as is clearly shown in Fig. 1, such loops being positioned in spaced relation to each other at opposite sides of the band. The opposite end of the band 18, at the left in Fig. 1, is provided with a loop 31 welded to the band at 32 in position to stand normally between the loops 28 and 29 in about the position as shown in Fig. 3.

With two pipes 15 and 16 in position as shown in Fig. 3, and with a band 18 equipped with a gasket 24 positioned about the ends of the pipes as shown in Fig. 3, the parts are in condition for the tightening of the band 18. This result is attained by the use of a tapered locking member 33, the small end of which is inserted through the loops 29, 31 and 28, with the straight side in engagement with the ends of the loops 28 and 29 and with the obliquely disposed edge in engagement with the end of the loop 31. The locking member is then driven longitudinally of the pipes into position for carrying the intermediate loop 31 toward the right in Fig. 1 with respect to the loops 28 and 29 for tightening the band and the gasket about the pipes. When the locking member 33 reaches its final operative position with the parts tightened securely about the pipes, a tongue 34 carried by the locking member 33 springs into latching engagement with the side face of the loop 28 so as to prevent withdrawal of said locking member. In the arrangement shown, the tongue 34 is struck out from the member 33, as is best shown in Fig. 5. When the locking member is moving through the loops, the tongue 34 is displaced slightly toward the plane of the locking member against the resiliency of the metal, as will be readily understood. When pressure is applied upon the band 18 for bringing the end portions from their spaced relation as shown in Fig. 7 to their abutting relation as shown in Fig. 8, the end portions of the gasket 24 are compressed longitudinally by pressure from each end of the gasket upon the opposite end. With the ends of the gasket cut obliquely as shown in Fig. 7, the pressure of one end portion of the gasket upon the other end portion tends to force both end portions inwardly toward the pipes 15 and 16 rather than outwardly away from the pipes. Under these circumstances, as the end portions are brought gradually closer to the pipes in their movement with the tightening band 18 the end faces of the gasket are pressed very tightly against each other so as to provide an effective seal at this point as well as all other points around the pipes.

The fabric 26 prevents the gasket from being stretched appreciably during its insertion into the groove 21. This fact is particularly important as at times it may become necessary to replace the gasket and if this is done in the field, the workman might stretch the gasket to have its ends extend larger distances than is desirable beyond the ends of the split band or ring. The workman would then probably cut off the excess length and when the coupling was subsequently contracted or compressed around the adjacent ends of two pipes there would not be sufficient gasket material to insure a fluid-tight seal.

Another advantage of the improved construction wherein the fabric 26 reinforces the gasket 24 is that if the pressure within the pipe line falls below atmospheric pressure, the fabric will prevent or resist any tendency of the rubber gasket to become distorted so that a portion of it will enter between the two ends of the pipe. When the rubber gasket is drawn between the two ends of the connected pipes there is a tendency of the pipes to abrade the gasket or cut it when the pipes expand and contract due to thermal conditions.

As will be readily understood, when the gasket 24 is tightened between the band 18 and the outer faces of the pipes, the gasket is compressed to a higher degree at the thicker portions at opposite sides of the central groove 27 than at other points. This serves to accentuate the pressure of the gasket against the pipes particularly at the face portions of the groove.

When it is desired to couple the pipe 15 to the pipe 16, the coupling is first expanded by inserting the locking member or wedge 33 in the loops 28 and 29 opposite the outer end of the loop 31 and is driven into position for forcing the loop 31 toward the left in Fig. 3 with respect to the loops 28 and 29. A tapered bearing plate 35 is provided on the end face of the loop 31 as best shown in Figs. 2 and 6. The bearing plate 35 is of such length as to extend a short distance into the loops 28 and 29. When the wedge 33 is inserted in position as shown in Fig. 3 and driven into the loops 28 and 29, the plate 35 provides means to prevent the tendency of the wedge to force the loop 31 radially outward or inward. The extension of the plate 35 into the loops 28 and 29 limits the distance to which the loop 31 can be driven toward the left in Fig. 3 with respect to the loops 28 and 29. The extent of the opening of the ring 18 is thus limited. The extension of the bearing plate 35 into the loops 28 and 29 also serves to hold these loops substantially in alignment with the loop 31 at all times. The plate 35 serves to insure sufficient opening of the band with the same type of wedge 33 that is used to close the band. The tongue 34 may be driven into permanent alignment with the body of the wedge and this particular wedge may be used by the workmen for opening coupling bands.

Assuming that a wedge 33 has been employed to expand the coupling member to bring it into the condition wherein it is illustrated in Figs. 3, 4 and 7, it will be readily understood that it may be slipped over the end of either of the pipes 15 and 16 and then the other pipe may be brought into proper position, whereupon the coupling member may be aligned with the joint between the pipes. The wedge 33 may then be removed from its position in the loops 28 and 29 and the coupling will contract to some extent, whereupon the operator will insert a similar wedge 33, which has not had its tongue 34 driven into permanent alignment with the body thereof, through all of the loops as illustrated in Fig. 1 and, as hereinbefore explained, this wedge member 33 is driven through the loops until it reaches the position wherein it is shown in Fig. 1 so that the tongue 34 springs outwardly from the wedge member to lock the wedge member against accidental withdrawal from the loops. The gasket 24 will then be in a compressed condition as best illustrated in Fig. 5.

Obviously the wedge may be removed if it is so desired by employing any suitable tool for forcing the tongue 34 back into the recess or aperture in the wedge 33 so that it will not impede withdrawal of the wedge from the loops. It is therefore obvious that one may then employ the wedge in the manner described above to expand the coupling member so that the pipes 15 and 16 will be disconnected from each other.

By the use of the improved pipe coupling means as hereinabove described, an operator is enabled very easily to effect a sealed closure between two aligned pipes with an assurance that the seal is effective.

As pointed out above, the bearing plate 35 attached to the end of the center loop 31 has several functions. It facilitates the task of entering the wedge for opening or spreading the coupling. It avoids the necessity of a special wedge to obtain a sufficient opening of the coupling and it also prevents offsetting of the ends of the band relative to each other. If offsetting occurred, the lagging end or side would prevent one from slipping the coupling on the pipe end.

The fabric 26 may be made of any suitable material but canvas or duck is used preferably.

As set forth above, the coupling shown in the drawings is a preferred form of the invention. The coupling is split only at one point so that it is a very simple matter to lock the coupling in place on the pipe ends, it being only necessary for the workman to drive in the wedge 33. No special tools are required for this operation.

It is contemplated that for some of the smaller sizes of pipe the couplings will be made in two or more arcuate sections having substantially the same loops and wedge means for securing the sections to each other. However, satisfactory couplings of the construction shown in the drawings have been made for pipes with a diameter as small as six inches. It may be preferable in the smaller sizes to have the band thickened substantially midway between its ends and taper it from that portion to the ends.

One problem to be overcome in small sized, one-piece couplings has been to obtain sufficient opening and closing of a band of necessary thickness to withstand corrosion. The band will take a permanent set if opened too far and this set will usually be directly opposite the break in the band. This tendency may be overcome to a substantial degree by having the band of less stiffness or thickness toward the ends thereof. In opening such a band the expanded outline is more nearly a circle.

The thickness of the band is governed by the pressure and the corrosion to which the band will be subjected. The band normally should be thicker in cross section than the pipe with which it is used so that the couplings will not be the weak points in a pipe line. Of course, the band for smaller sizes could be made sufficiently light so that it could be readily opened and closed, but such a band, if made with metal subject to corrosion, would weaken before the pipe and would not be commercially satisfactory. Neither would it be suitable for much pressure.

It is contemplated that in cases where small sizes of pipe are used under severe conditions of pressure and corrosion, the couplings will have to be made of metal too heavy to carry out satisfactory installation in one piece. In such cases the structural features of the present device may be embodied in couplings where the band consists of two or more arcuate sections.

It is contemplated that in some instances a wire fabric may be employed and in such instances it is contemplated that the fabric will not extend the entire length of the gasket but will be cut away one or two inches from each end.

In order to obtain the desired results in a simple, practical manner, I find it necessary to have the gasket substantially inside the confines of the band, that is, between the inner and outer circumferences of the band. The gasket should be carried by the band. The principal advantages of the coupling are best obtained by such a construction. They cannot be obtained if the gasket is put in place on the pipe and the band is then spread over it. A one-piece band of sufficient strength doesn't open enough without deforming to go over a gasket on the outside of the pipe.

While the form and arrangement of parts as shown and described are preferred, it is to be understood that the invention is not limited to the arrangements shown except so far as the claims may be so limited, it being understood that changes might well be made in the construction without departing from the spirit of the invention.

I claim:

1. A pipe coupling comprising in combination a split band adapted to be mounted loosely on the adjoining ends of two pipes with the end portions of the band in slightly spaced relation to each other, loops on the end portions of said band in overlapping relationship to each other, a tapered locking member adapted when driven into said loops longitudinally of the pipes to tighten the band on the pipes, and a resilient tongue on said locking member adapted to spring into holding engagement with one of said loops for preventing the withdrawal of the locking member when said band has been fully tightened in position.

2. A pipe coupling comprising in combination a split band adapted to be mounted loosely on the adjoining ends of two pipes with the end portions of the band in slightly spaced relation to each other, two loops in laterally spaced relation to each other on one of the end portions of said band, a third loop on the other end portion of said band in position to stand normally between said first-named two loops, a tapered locking member adapted when driven into said three loops longitudinally of the pipes to tighten the band on the pipes, and bearing means on the outer end face of the loop means at one end of the band adapted by engagement with said tapered locking member in changed position to cause said band to be loosened from engagement with said pipes.

3. A pipe coupling comprising in combination a split band adapted to be mounted loosely on the adjoining ends of two pipes with the end portions of the band in slightly spaced relation to each other, two loops in laterally spaced relation to each other on one of the end portions of said band, a third loop on the other end portion of said band in position to stand normally between said first-named two loops, a tapered locking member adapted when driven into said three loops longitudinally of the pipes to tighten the band on the pipes, and key means carried by the loop means at one end of the band extending into the loop means at the other end of the band and serving to limit the opening movement of the band and to maintain said loops in partially registered position with respect to each other.

4. A pipe coupling comprising in combination a split band adapted to be mounted loosely on the adjoining ends of two pipes with the end portions of the band in slightly spaced relation to each other, two loops in laterally spaced relation to each other on one of the end portions of said band, a third loop on the other end portion of said band in position to stand normally between said first-named two loops, a tapered locking member adapted when driven into said three loops longitudinally of the pipes to tighten the band on the pipes, and a key in the form of a plate having an obliquely disposed outer face and secured on the outer end face of said third loop and extending into said first-named two loops adapted by engagement with said tapered locking member in changed position to cause said band to be loosened from said pipes and serving to limit the opening movement of the band and to maintain said loops in partially registered position with respect to each other.

5. A pipe coupling adapted to connect the ends of two pipes which are provided with annular channels in the exterior surface thereof in close proximity to the ends, said pipe coupling comprising in combination a one-piece split band having inwardly extending flanges at its side edges adapted to seat in the channels of the pipes, the band being capable of opening to a slightly larger interior diameter than the exterior diameters of the pipe ends, whereby the flanges can be passed over the pipe ends to provide for engagement of said flanges in the annular channels of the pipes, a split gasket of compressible material secured in said split band between the flanges and being located entirely between the flanges whereby it is protected from the pipe edges by said flanges, said gasket extending completely about the band and being of greater interior girth than the band length so that it extends beyond the ends of the band whereby the gasket slips freely over the pipe ends without stretching and is compressed when tightened by the band on the pipe ends, said gasket having a deep groove in its inner face extending from end to end thereof, and a strip of comparatively non-yielding flexible material secured to the outer face of said gasket thereby preventing stretching of said gasket and imparting rigidity to the thin gasket material at the bottom of said groove whereby to prevent the material from collapsing inwardly into the path of the ends of the pipes.

6. A pipe coupling adapted to connect together the ends of two pipes which are provided with annular channels in the exterior surface thereof in close proximity to the ends of the pipes, said coupling comprising a single length of channel shaped metal curved to a circular band shape with the side flanges facing inwardly whereby to seat in the pipe channels and thus to connect, mechanically, the two pipe ends to each other when the band is tightened, the band being capable of opening to a slightly larger interior diameter than the exterior diameters of the pipe ends, whereby the flanges can be passed over the pipe ends to provide for engagement of said flanges in the annular channels of the pipes, a split gasket of compressible material secured in the channel of said band, the gasket being somewhat longer than the band whereby the ends of the gasket meet and are compressed endwise before the ends of the band meet, and means to draw the ends of the band together.

7. A pipe coupling adapted to connect together the ends of two pipes which are provided with annular channels in the exterior surface thereof in close proximity to the ends of the pipes, said coupling comprising a single length of channel shaped metal curved to a circular band shape with the side flanges facing inwardly whereby to seat in the pipe channels and thus to connect, mechanically, the two pipe ends to each other when the band is tightened, the band being capable of opening to a slightly larger interior diameter than the exterior diameters of the pipe ends, whereby the flanges can be passed over the pipe ends to provide for engagement of said flanges in the annular channels of the pipes, a split gasket of compressible material secured in the channel of said band, said band having an undercut groove in the inner surface thereof between the flanges and spaced from said flanges, the gasket being seated in the groove and spaced from the flanges, and means to draw the ends of the band together.

CARL G. NAYLOR.